US009979045B2

(12) United States Patent
He et al.

(10) Patent No.: US 9,979,045 B2
(45) Date of Patent: May 22, 2018

(54) BIOPOLAR BATTERY, MANUFACTURING METHOD THEREOF AND VEHICLE (71) Applicants: SHENHUA GROUP CORPORATION LIMITED, Beijing (CN); NATIONAL INSTITUTE OF CLEAN-AND-LOW-CARBON ENERGY, Beijing (CN)

(72) Inventors: Guangli He, Beijing (CN); Simon Xue, Beijing (CN); Francis Wang, Beijing (CN); Yu Ren, Beijing (CN); Guowen Wang, Beijing (CN)

(73) Assignees: SHENHUA GROUP CORPORATION LIMITED, Beijing (CN); NATIONAL INSTITUTE OF CLEAN-AND-LOW-CARBON ENERGY, Beijing (CN)

( * ) Notice: Subject to any disclaimer, the term of this patent is extended or adjusted under 35 U.S.C. 154(b) by 136 days.

(21) Appl. No.: 14/772,252

(22) PCT Filed: Mar. 5, 2013

(86) PCT No.: PCT/CN2013/072184
§ 371 (c)(1),
(2) Date: Sep. 2, 2015

(87) PCT Pub. No.: WO2014/134783
PCT Pub. Date: Sep. 12, 2014

(65) Prior Publication Data
US 2016/0020481 A1 Jan. 21, 2016

(51) Int. Cl.
H01M 10/04 (2006.01)
H01M 2/02 (2006.01)
H01M 2/26 (2006.01)

(52) U.S. Cl.
CPC ....... *H01M 10/0418* (2013.01); *H01M 2/024* (2013.01); *H01M 2/266* (2013.01); *H01M 10/04* (2013.01)

(58) Field of Classification Search
CPC .. H01M 10/0418; H01M 2/024; H01M 2/266; H01M 10/04
See application file for complete search history.

(56) References Cited

U.S. PATENT DOCUMENTS 8,357,469 B2   1/2013  Shaffer, II et al.
2008/0138706 A1* 6/2008 Takayama ......... H01M 10/0418
429/210

(Continued)

FOREIGN PATENT DOCUMENTS

CN   2588551 Y    11/2003
CN  201789041 U    4/2011

(Continued)

OTHER PUBLICATIONS

International Search Report mailed in corresponding International Patent Application No. PCT/CN2013/072184 dated Dec. 12, 2013, consisting of 8 pp. (English translation provided).

*Primary Examiner* — Gregg Cantelmo
(74) *Attorney, Agent, or Firm* — Volpe and Koenig, P.C.

(57) ABSTRACT

A bipolar battery, a manufacturing method thereof and a vehicle comprising the bipolar battery. The bipolar battery comprises a case comprising a first half case and a second half case; at least one bipolar plate with periphery sealed and sandwiched between the first half case and the second half case; and at least two electrical cores located at opposite two sides of the bipolar plate, respectively. With using the case made of flexible packaging material and sealing the peripheries of the bipolar plate collector and the case by sticking, it is easy to assemble and maintain the bipolar battery.

7 Claims, 6 Drawing Sheets (56) References Cited

U.S. PATENT DOCUMENTS

2011/0039146 A1* 2/2011 Sato ................ H01M 10/0418
  429/152
2011/0091770 A1 4/2011 Han et al.

FOREIGN PATENT DOCUMENTS

| CN | 202275884 U | | 6/2012 |
|---|---|---|---|
| JP | 8-7926 A | | 1/1996 |
| JP | 11-265693 A | | 9/1999 |
| JP | 2005-149833 A | | 6/2005 |
| JP | 2005149833 A | * | 6/2005 |
| KR | 10-2008-0099890 A | | 11/2008 |
| KR | 20080099890 A | | 11/2008 |

* cited by examiner

BIOPOLAR BATTERY, MANUFACTURING METHOD THEREOF AND VEHICLE

This application is a 35 U.S.C. § 371 national stage application of PCT/CN2013/072184, which was filed Mar. 5, 2013 and is incorporated herein by reference as if fully set forth.

FIELD OF THE INVENTION

The present invention relates to batteries, particularly to a bipolar battery, a manufacturing method thereof, and a vehicle comprising the bipolar battery.

BACKGROUND OF THE INVENTION

In prior art, in order to raise the output voltage of a battery, the method of stacking bipolar plates coated with positive electrode active material and negative electrode active material on the two sides respectively and diaphragms laminating alternately may be adopted, but this method can only obtain the needed output voltage and cannot obtain the needed output current, resulting in imbalance between output voltage and output current of the battery. Although current may be raised by increasing the number of pole pieces in parallel, insulating and sealing pieces shall be disposed between the peripheries of two bipolar plates isolated by one or a plurality of layers of diaphragms during manufacturing of such batteries. For this reason, whenever one bipolar plate is installed, insulating and sealing pieces shall be disposed on their peripheries or on the peripheries of the diaphragms adjacent to it. The manufacturing process is very complex and not conducive to replacement and maintenance. Further, after the stacking reaches the needed output voltage, mechanical force must be applied at the two ends for compaction to obtain a required sealing effect, adding difficulty to manufacturing process and maintenance. Meanwhile, this structure is unable to solve the problem of venting the gas generated after battery formation.

SUMMARY OF THE INVENTION

The object of the present invention is to provide a bipolar battery which can raise output voltage and output current.

In order to realize the foregoing object, the present invention provides a bipolar battery, wherein the bipolar battery comprises a case having a first half case and a second half case; at least one bipolar plate, with periphery sealed and sandwiched between the first half case and the second half case; and at least two electrical cores located at opposite two sides of the bipolar plate respectively.

The present invention also provides a manufacturing method of the bipolar battery, comprising steps of: providing at least one bipolar plate; electrically connecting at least one electrical core to each of the two sides of the bipolar plate and connecting the electrical cores in series through the bipolar plate; providing a first half case and a second half case to encapsulate the electrical core from the two sides of the bipolar plate and sandwich the periphery of the bipolar plate between the first half case and the second half case; and insulating and sealing the contact locations of the bipolar plate, the first half case and the second half case.

The present invention also provides a manufacturing method of the bipolar battery, including the following steps: arranging a electrical core on one side of a positive collector so that the positive collector and a first half case together encapsulate the electrical core and insulate and seal the peripheral contact portion between the positive collector and the first half case; arranging another electrical core on one side of a negative collector so that the negative collector and the second half case encapsulate the electrical core and insulate and seal the peripheral contact portion between the negative collector and the first half case; connecting the positive collector and the negative collector to make another side of the positive collector and another side of the negative collector contact each other and from a bipolar plate. The present invention also provides a vehicle, comprising the bipolar battery. The bipolar battery is used to provide power for the vehicle.

Through the foregoing technical solution, on the one hand, output voltage can be raised by installing bipolar plates and on the other hand, encapsulation may be adopted only on the peripheries of the bipolar plate and the case to make for assembly and maintenance and handle the problem of gas generation after battery formation.

Other features and advantages of the present invention will be described in details in the subsequent embodiments.

BRIEF DESCRIPTION OF THE DRAWINGS

The accompanying drawings are intended to provide further understanding on the present invention and constitute a part of the specification. They and the following embodiments are intended to jointly explain the present invention, but not to limit the present invention. In the accompanying drawings.

| Description of Reference Signs | | | |
|---|---|---|---|
| 1: case | | 2: first case | 3: second case |
| 4: bipolar plate | | 41: Al foil | 42: Cu foil |
| 5a: first electrical core | | 5b: second electrical core | |
| 6a: first positive lead | | 6b: second positive lead | |
| 7a: first negative lead | | 7b: second negative lead | |
| 8: positive collector | | 8': double-sided positive plate | |
| 9: negative collector | | 9': double-sided negative plate | |
| 10: positive electrode active material | | 11: negative electrode active material | |
| 12: diaphragm | | 13: tab film | |
| 14: first sealant | | 15: second sealant | |
| 21: positive tab | | 22: negative tab | |

DETAILED DESCRIPTION OF THE EMBODIMENTS

Below concrete embodiments of the present invention are described by referring to the accompanying drawings. It should be understood that the embodiments described here are intended to illustrate and not to limit the present invention.

In the present invention, in order to make for understanding and description, unless otherwise stated, the used prepositions, such as: "on, over, above, below, under, left and right" usually refer to "on, over, above, below, under, left and right" shown in the attached reference drawings; "inside and outside" refer to the inside and outside relative to the outline of each component, but the above prepositions are not intended to limit the present invention. Further, in the present invention, "a plurality of" means two or more than two.

Further, in the present invention, bipolar plate refers to an electrode plate with one side as a positive collector and another side as a negative collector, and may form a bipolar electrode by applying positive electrode active material and negative electrode active material on the two opposite surfaces of the bipolar plate.

Below a lithium ion battery is taken for example to describe the bipolar battery provided by the present invention.

The bipolar battery provided by the present invention comprises at least two electrical cores, which realize the objective of series connection through bipolar plate 4. Each electrical core comprises one or a plurality of unit cells in parallel. Each unit cell comprises positive collector 8, negative collector 9, positive electrode active material 10, negative electrode active material 11 and diaphragm 12. The collectors are made of copper, aluminum or copper aluminum composite material or other conductive materials. The positive collector 8 coated with positive electrode active material 10 forms a positive. The negative collector 9 coated with negative electrode active material 11 forms a negative. The diaphragm 12 is used to isolate positive and negative and only allows the passage of lithium ions.

In an embodiment, bipolar plate 4 is a collector with one side coated with a positive electrode active material and the opposite side coated with a negative electrode active material. In another embodiment, each battery pack comprises at least one double-sided unipolar plate. The double-sided unipolar plate mentioned here is a collector with two opposite sides coated with a same-polarity active material. If the two sides are both coated with a positive electrode active material, then this unipolar plate may be considered as a double-sided positive plate 8'. If the two sides are both coated with a negative electrode active material, then this unipolar plate may be considered as a double-sided negative plate 9'. Supposing every electrical core consists of N unit cells in parallel. If N is an even number, then N/2 double-sided positive plates 8', N/2 double-sided negative plate 9' and N diaphragms 12 placed among double-sided positive plates 8', double-sided negative plates 9' and bipolar plates 4 need to be stacked in an alternative way. If N is an odd number and the electrical core is on the side of the positive of bipolar plate 4, then [(N+1)/2]−1 double-sided positive plates 8', (N+1)/2 double-sided negative plates 9' and N diaphragms 12 need to be stacked; if N is an odd number and the electrical core is on the side of negative of bipolar plate 4, then [(N+1)/2]−1 double-sided negative plates 9', (N+1)/2 double-sided positive plates 8' and N diaphragms 12 need to be stacked. Of course, the outermost (nearest to case 1) double-sided positive plate 8' or double-sided negative plate 9' may also be replaced with a single-sided positive plate or a single-sided negative plate, i.e.: a collector with only one side coated with a positive or negative electrode active material. As understood by those skilled in the art, in order to realize the objective of series connection of battery packs, the double-sided unipolar plate inside the electrical core on the side of negative of bipolar plate 4 and nearest to bipolar plate 4 shall be a double-sided positive plate 8'; on the opposite, the double-sided unipolar plate inside the electrical core on the side of positive of bipolar plate 4 and nearest to bipolar plate 4 shall be a double-sided negative plate 9'. It should be noted that using double-sided unipolar plates with different polarity and diaphragms 12 to constitute a plurality of unit cells in parallel as described above is only an embodiment of the present invention, but the present invention has no intention to set any limitation to the structure of unit cells or electrical cores. Every electrical core comprising one or a plurality of unit cells may be used in the present invention.

The present invention provides a bipolar battery. The bipolar battery comprise: a case 1, consisting of a first half case 2 and a second half case 3; at least one bipolar plate 4, with periphery sealed and sandwiched between the first half case 2 and the second half case 3; and at least two electrical cores located at opposite two sides of the bipolar plate respectively.

In the bipolar battery provided by the present invention, on the one hand, output voltage can be raised by installing bipolar plates 4 and on the other hand, encapsulation may be adopted only on the peripheries of bipolar plate 4 and case 1 to make for assembly and maintenance, while bipolar plate 4 with periphery sandwiched between the first half case 2 and the second half case 3 also plays a role in supporting and fixing the electrical cores on its two sides and helps improve the stability of the entire battery.

Preferably, hot melt adhesive may be smeared between the first half case 2 and the bipolar plate 4 and between the second half case 3 and the bipolar plate 4 so that hot melt sealing is formed between the periphery of bipolar plate 4 and the first half case 2 and between the periphery of bipolar plate 4 and the second half case 3.

Further, preferably, at least the locations where the first half case 2 and the second half case 3 contact the bipolar plate 4 may be made of flexible packing material, thereby making for assembly and maintenance. This will be described in details below. In national general packaging terms (GB4122-83), the definition of flexible package: flexible package refers to a package of which shape is changeable after the content is put in or taken out. All kinds of bags, boxes, sleeves and envelops made of paper, aluminum foil, fiber, plastic membrane or their compounds are flexible packages. The flexible packaging material in the present invention shall also meet the requirements for resistance to electrolyte in battery, low air permeability and low water permeability. More preferably, case 1 may integrally form a flexible package. In other words, the first half case 2 and the second half case 3 may be separately made of a flexible packaging material, which may be Al compound packing film, modified PE, PP or other materials. Specifically, the first half case 2 and the second half case 3 both may be Al compound packing films with a 3-layer or 5-layer structure and a thickness of 0.08-0.18 mm.

Alternatively, the first case 1 and the second case 3 may also be made of hard packaging material, such as: metal sheet, so that case 1 forms a hard package.

In the present invention, there may be at least one bipolar plate 4, which divides the interior of the case 1 into a plurality of chambers. One electrical core may be arranged in each chamber. Each electrical core may comprise one unit cell or a plurality of unit cells in parallel. Further, a plurality of electrical cores are connected in series through the bipolar plate 4.

In the bipolar battery provided by the present invention, by connecting the electrical cores in series through bipolar plate 4, the output voltage of the battery may be multiplied. By arranging parallel unit cells in a plurality of chambers, battery capacity can be raised, thereby obtaining a battery which can output appropriate current and voltage.

Preferably, the electrical cores include a first electrical core 5a inside the chamber between the first half case 2 and the bipolar plate 4 adjacent to the first half case 2, and a second electrical core 5b inside the chamber between the second half case 3 and the bipolar plate 4 adjacent to the second half case 3. An appropriate layout may be adopted to connect first electrical core 5a and second electrical core 5b in series through bipolar plate 4.

Figure 1:
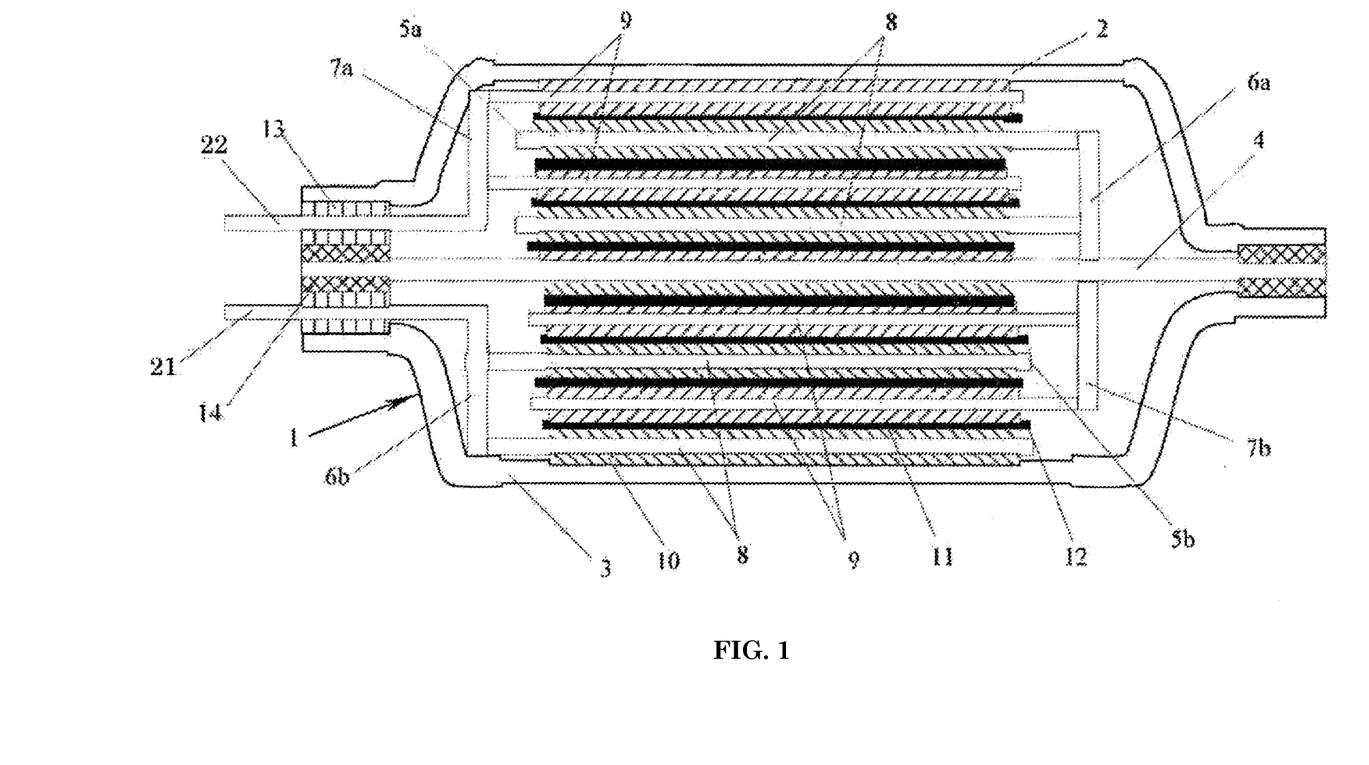
FIG. 1 is a schematic diagram of the internal structure of an embodiment of the bipolar battery provided by the present invention.

In a preferred embodiment of the present invention, as shown in FIG. 1, the first electrical core 5a comprises a first positive lead 6a and a first negative lead 7a, and the second electrical core 5b comprises a second positive lead 6b and a second negative lead 7b. The first positive lead 6a is connected to the positive collector of the bipolar plate 4 adjacent to the first half case 2 (in FIG. 1, this positive collector is coated with a positive electrode active material). The first negative lead 7a is led out from between the first half case 2 and the bipolar plate 4. The second positive lead 6b is led out from between the bipolar plate 4 and the second half case 3. The second negative lead 7b is connected to the negative collector of the bipolar plate 4 adjacent to the second half case 3 (in FIG. 1, this negative collector is coated with a negative electrode active material).

Wherein, the second positive lead 6b and the first negative lead 7a may be led out via positive tab 21 and negative tab 22 respectively. On the periphery of the case 1, insulating and sealing pieces may be arranged among the bipolar plate 4, the first half case 2, the second half case 3, positive tab 21 and negative tab 22. The insulating and sealing pieces may be made of one of PP with high melt strength, PE, modified PE, polyurethane, thermoplastic olefin rubber, polyamide resin, PTEF, polyvinylidene fluoride, polystyrene and silicon rubber, or their compounds. The insulating and sealing pieces may include tab film 13, first sealant 14 and second sealant 15.

Specifically, tab films 13 are adopted to realize sealing and insulation on the periphery of the case 1, between the positive tab 21 and the case 1 (i.e.: the second half case 3), and between the negative tab 22 and the case 1 (i.e.: the first half case 2); tab film 13 and first sealant 14 are adopted to realize sealing and insulation between the positive tab 21 and the bipolar plate 4 and between the negative tab 22 and the bipolar plate 4 wherein the tab film 13 contacts the positive tab 21 and negative tab 22, and the first sealant 14 contacts the bipolar plate 4; first sealant 14 is adopted to realize sealing and insulation between the bipolar plate 4 and the first half case 2 and between the bipolar plate 4 and the second half case 3; second sealant 15 is adopted to realize sealing and insulation between adjacent bipolar plates 4; the melting point of the second sealant 15 is lower than that of the first sealant 14.

Wherein: one side of tab film 13 is used to realize sealing between tab and case 1, and the other side is used to integrate first sealant 14 to form sealing; the objective of using the first sealant 14 is to ensure the insulation and sealing between case 1 and bipolar plate 4 and the insulation and sealing between the tab and bipolar plate 4; the second sealant 15 is used to realize insulation and sealing between two adjacent bipolar plates 4. Therefore, alternatively, the side of tab film 13 corresponding to the first sealant 14 may be made into an integral body with the first sealant 14 to form sealing and insulation between the tab and bipolar plate 4. Obviously, the foregoing tab film 13 has slight difference in function from the first sealant 14 and the second sealant 15, but ordinary tab films available in the current market all can meet the foregoing requirements.

In the present invention, various appropriate methods may be adopted to connect a plurality of unit cells in parallel in order to form first electrical core 5a and second electrical core 5b.

For example, in the embodiment shown in FIG. 1, the first electrical core 5a and the second electrical core 5b respectively comprise at least one unit cell. Each unit cell comprises positive collector 8, positive electrode active material 10, diaphragm 12, negative collector 9 and negative electrode active material 11 arranged in a stack-up way. Every positive collector 8 of the first electrical core 5a is connected to the first positive lead 6a. Every first negative collector 9 of the first electrical core 5a is connected to the first negative lead 7a. Every second positive collector 8 of the second electrical core 5b is connected to the second positive lead 6b. Every second negative collector 9 of the second electrical core 5b is connected to the second negative lead 7b. In the present invention, each lead may be a separate module or the extension of the collector. No limitation is set here. Further, the leads may be connected together at the output ends so that they can be jointly connected to the corresponding tabs or bipolar plates 4.

Further, the bipolar plate 4 may be disposed in parallel with the positive collector 8 and the negative collector 9 to simplify the structure and reduce overall size.

It can be understood that those skilled in the art may arrange the leads and tabs in various ways as long as they can be easily led out or connected to bipolar plate 4 via corresponding tabs. Preferably, as shown in FIG. 1, the first positive lead 6a and the second negative lead 7b connected to the bipolar plate 4 are located on a same side of the case 1. The second positive lead 6b and the first negative lead 7a led out from between the first half case 2 and the second half case 3 are located on another side of the case 1. Thereby, on the one hand, the mutual interference of the tabs of different polarity in a same chamber may be avoided and on the other hand, heat generation may be reduced and the battery can dissipate heat evenly.

Figure 4:
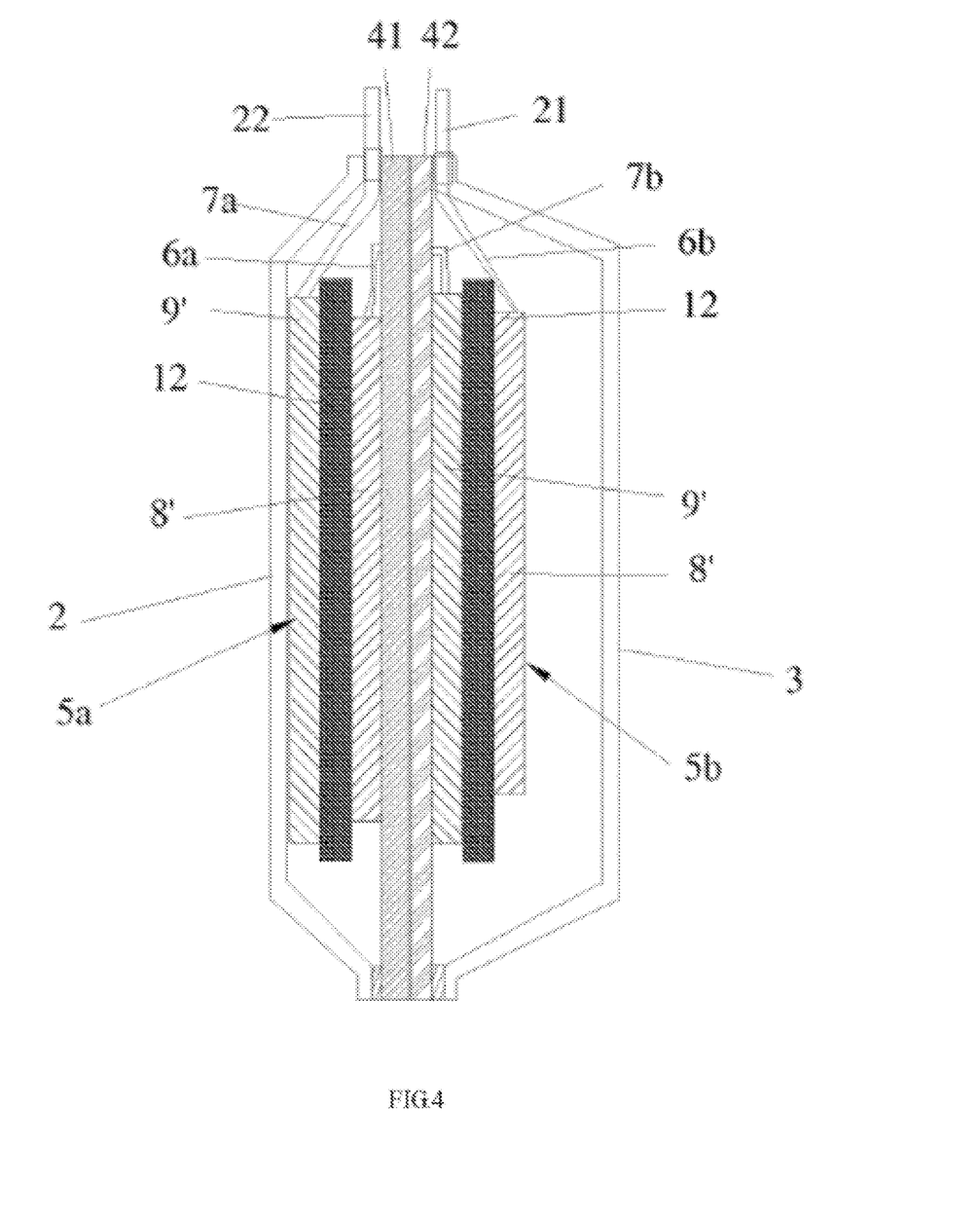
Figure 5:
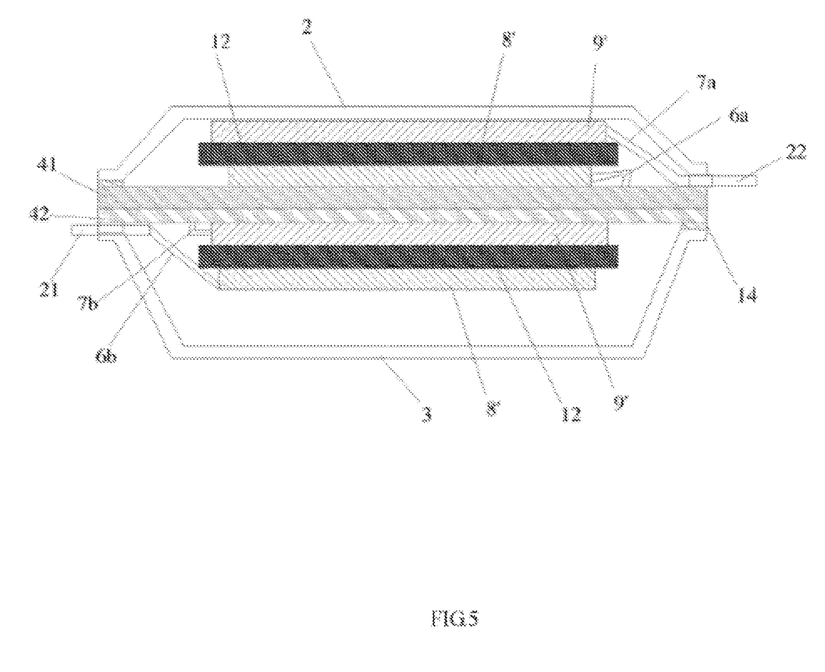
FIG. 5 is a schematic diagram of the internal structure of another embodiment of the bipolar battery provided by the present invention.

Alternatively, second positive lead 6b and first negative lead 7a may be led out from different sides of case 1 so that positive tab 21 and negative tab 22 are extended in different directions, as shown in FIG. 5. Further, first positive lead 6a and first negative lead 7a may be located on a same side (as shown in FIG. 4) or on different sides of case 1 and likewise, second positive lead 6b and second positive lead 7b may be located on a same side (as shown in FIG. 4) or on different sides of case 1.

Further, there may be a plurality of bipolar plates 4, the ion battery unit comprises a third electrical core 5c located between two adjacent bipolar plates 4, the third electrical core 5c comprises a third positive lead 6c and a third negative lead 7c, the third positive lead 6c is connected to the positive of one of the two adjacent bipolar plates 4, and the third negative lead 7c is connected to the negative of the other adjacent bipolar plate 4.

Wherein, similar to first electrical core 5a and second electrical core 5b, the third electrical core 5c may comprise at least one unit cell, every positive collector 8 of the third electrical core 5c is connected to the third positive lead 6c, and every first negative collector 9 of the third electrical core 5c is connected to the third negative lead 7c.

When the bipolar battery has a plurality of bipolar plates 4, in other words, when more than two electrical cores are connected in series through bipolar plates 4 to raise output voltage, the peripheries of these bipolar plates 4 are still sandwiched between the first half case 2 and the second half case 3, and insulation and sealing are provided between bipolar plates 4 and between bipolar plate 4 and case 1.

Figure 2:
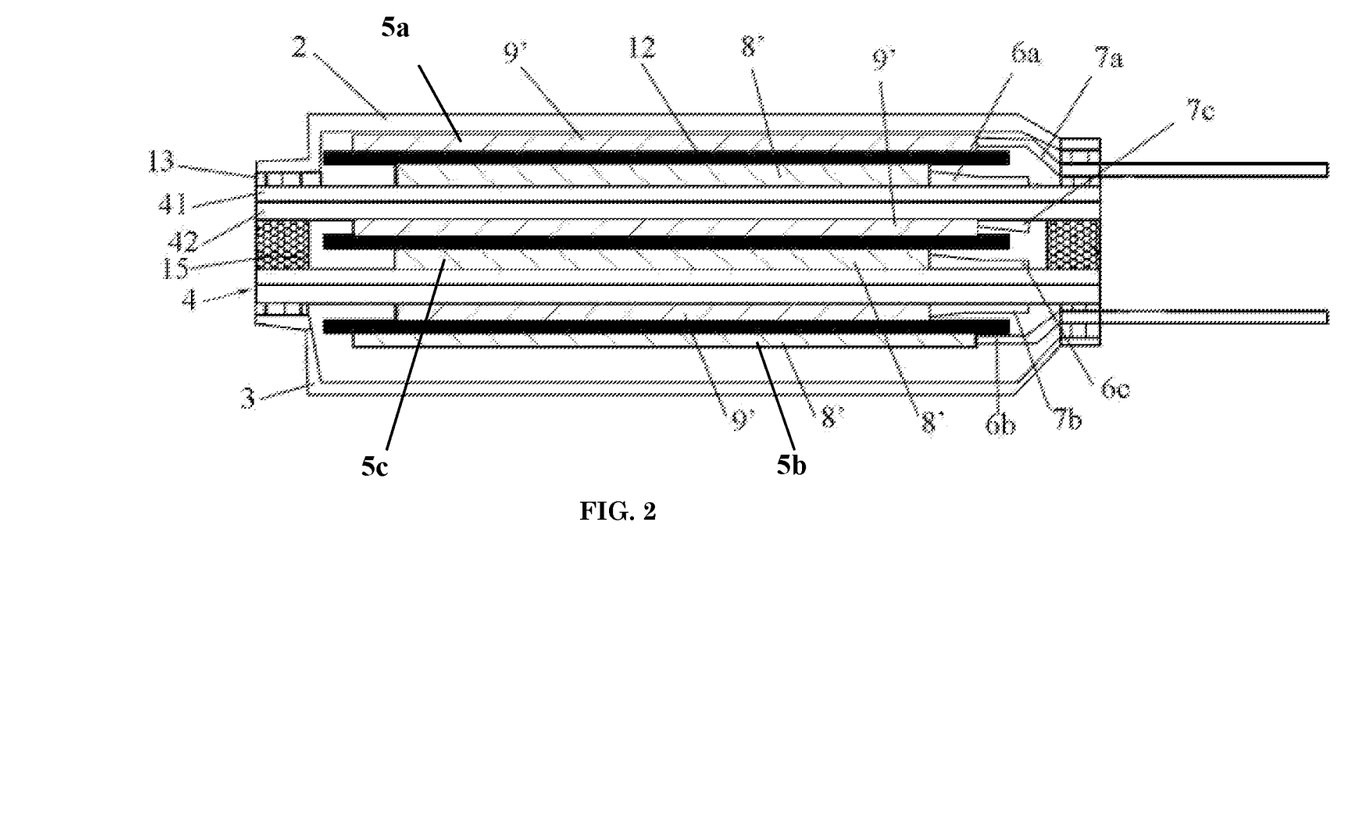
FIG. 2 is a schematic diagram of the internal structure of another embodiment of the bipolar battery provided by the present invention.

The embodiment in FIG. 2 shows the circumstance of two bipolar plates 4, wherein, each of first electrical core 5*a*, second electrical core 5*b* and third electrical core 5*c* has one positive collector 8 and one negative collector 9. In order to simplify the graphical representation, the collectors coated with a polar material on its two sides are expressed as integral double-sided unipolar plates. In FIG. 2, double-sided positive plate 8' stands for an positive collector 8 coated with a positive electrode active material 10 on its two sides, and double-sided negative plate 9' stands for a negative collector 9 coated with a negative electrode active material 11 on its two sides. The active materials on the two sides of bipolar plate 4 are provided by the double-sided unipolar plates on the two sides of bipolar plate 4. Bonding by second sealant 15 may be adopted on the periphery of case 1 and between two bipolar plates 4.

In the present invention, first case 2 and second case 3 may be made of 0.08-0.18 mm thick Al compound packing film produced by Showa Corporation or DNP; if the negative material is carbon or graphite, positive collector 8 and negative collector 9 may be made of aluminum foil and copper foil respectively. If the negative material is lithium titanate, positive collector and negative collector both may be made of aluminum foil, for example, both made of 0.01-0.04 μm thick aluminum foil; positive electrode active material may be LFP, lithium cobalt oxide, lithium manganate or ternary material and the coating thickness is 0.01-0.05 μm; negative electrode active material may be LTO, C, graphite, or grapheme and the coating thickness is 0.01-0.05 μm; the electrolyte injected into case 1 may be lithium hexafluorophate. Bipolar plate 4 may be made of an appropriate material, such as: Cu—Al composite board, graphite plate, carbon fiber plate or aluminum foil. If the negative electrode active material used by the battery is carbon, graphite, graphene or other low-potential materials, bipolar plate 4 preferably is a Cu—Al composite board (copper side corresponds to negative, and aluminum side corresponds to positive), graphite plate and carbon fiber plate. In the embodiments shown in the figures, bipolar plate 4 adopts Cu—Al composite board. Specifically, in the embodiment shown in FIG. 2, Cu—Al composite board may be made of aluminum foil and copper foil through high-temperature machining. In the embodiment shown in FIG. 3, Al foil and Cu foil may be encapsulated in first half case 2 and second half case 3 at first, and then during the final encapsulation, Al foil and Cu foil contact each other through adhesion or mechanical force to form a Cu—Al composite board. One side of Cu—Al composite board is aluminum and the other side is copper, the aluminum side is coated with a positive electrode active material 10 and the copper side is coated with a negative electrode active material 11. Wherein, Cu foil is 0.006-0.2 μm thick and is used to apply a negative electrode active material 11, and Al foil is 0.01-0.3 μm thick. Further, bipolar plate 4 may also be made of graphite plate or carbon fiber plate, and its two surfaces are coated with a positive electrode active material and a negative electrode active material respectively. If the negative electrode active material used in the battery is lithium titanate or other high-potential materials, then preferably, bipolar plate 4 adopts aluminum foil, a positive electrode active material 10 is coated on one side of the aluminum foil and a negative electrode active material 11 is coated on the other side.

In the present invention, the two sides of bipolar plate 4 may be coated with a positive electrode active material and a negative electrode active material respectively or not coated with any active material. The bipolar plate 4 not coated with an active material only plays a role of internal series connection and cannot provide the material needed by internal reaction of the battery.

According to another aspect of the present invention, a vehicle is provided. This vehicle comprises a bipolar battery according to the present invention to provide power for the vehicle.

According to another aspect of the present invention, a manufacturing method of the bipolar battery is provided. This method includes the following steps: providing at least one bipolar plate 4; electrically connecting at least one electrical core to each of the two sides of the bipolar plate 4 and connecting the electrical cores in series through the bipolar plate; providing a first half case 2 and a second half case 3 to encapsulate the electrical core from the two sides of the bipolar plate and sandwich the periphery of the bipolar plate 4; and insulating and sealing the contact locations of the bipolar plate 4, the first half case 2 and the second half case 3.

Preferably, the method also includes connecting a plurality of unit cells in parallel to form the electrical core.

Below the manufacturing method of an embodiment of the bipolar battery according to the present invention is described in details, wherein the bipolar battery comprises a bipolar plate 4, as shown in FIG. 1.

Firstly, positive electrode active material 10 and negative electrode active material 11 are coated on the two opposite sides of bipolar plate 4 to form double electrodes. Then, the two sides of the bipolar plate 4 are electrically connected to first electrical core 5*a* and second electrical core 5*b* in series. Each of first electrical core 5*a* and second electrical core 5*b* comprises two unit cells, i.e.: each of first electrical core 5*a* and second electrical core 5*b* comprises two positive collectors 8 and two negative collectors 9, the two sides of positive collector 8 are coated with positive electrode active material 10, the two sides of negative collector 9 are coated with negative electrode active material 11, two parallel unit cells are formed in each of first electrical core 5*a* and second electrical core 5*b* through alternate stacking of positive collector 8, positive electrode active material 10, diaphragm 12, negative electrode active material 11 and negative collector 9.

Further, the end of one side of positive collector 8 of first electrical core 5*a* may be connected to first positive lead 6*a*, and the end of another side of negative collector 9 of first electrical core 5*a* may be connected to first negative lead 7*a*. The layout of second electrical core 5*b* is similar to that of first electrical core 5*a* and is not described again. Wherein, first negative lead 7*a* is led out via negative tab 22 and from between first half case 2 and bipolar plate 4, second positive lead 6*b* is led out via positive tab 21 from between second half case 3 and bipolar plate 4.

Then, first half case 2 and second half case 3 encapsulate first electrical core 5*a* and second electrical core 5*b* and sandwich bipolar plate 4, wherein positive tab 21 and negative tab 22 may be led out from a same side of case 1.

Lastly, tab film 13 and first sealant 14 may be used to bind the components on the side from which positive tab 21 and negative tab 22 (left side in FIG. 1) are led out. Meanwhile, first sealant 14 may be used to bind the periphery between bipolar plate 4 and first half case 2 and second half case 3, but it should be ensured that an unbound part is left. Then, electrolyte may be injected from the unbound part (for example, the left periphery and right periphery in FIG. 1 may be bound and one of the left periphery and right periphery in FIG. 1 may be connected, while the periphery on the other side is not bound in order to inject electrolyte). After the electrolyte is injected, rests and then is encapsulated and a battery is formed, if gas is generated, it may be vented from this side. Lastly, the unbound part is bound with first sealant 14 to complete encapsulation.

Preferably, first case 2 and second case 3 are both flexible packaging materials and case 1 forms a flexible package to make for the foregoing operations of electrolyte injection and venting. Further, when venting is undesirable or there is a problem inside the battery, the side encapsulated only by first sealant 14 may be opened. For example, the parts of first half case 2 and second half case 3 containing first sealant 14 may be cut off to make for further venting or battery maintenance. After venting or maintenance is completed, encapsulation may be conducted again by first sealant 14.

In the bipolar battery provided by the present invention, as shown in FIG. 1, hot-press encapsulation is implemented only on the periphery of case 1 through tab film 13 and first sealant 14 during assembly of case 1 (at the tab, two layers of encapsulation are needed, or if first sealant 14 is thick enough, it may also be encapsulated by first sealant 14) and integral squeezing is not needed. The manufacturing process is very simple. Further, as bipolar plate 4 is adopted, the bipolar battery according to the present invention can reduce heat generation during work and is conducive to its safety.

Preferably, in order to further simplify the encapsulation process of the bipolar battery provided by the present invention, the present invention also provides a manufacturing method of the bipolar battery, including the following steps: arranging a electrical core on one side of the positive collector so that the positive collector and the first half case 2 encapsulate the electrical core and insulate and seal the peripheral contact portion between the positive collector and the first half case 2; arranging another electrical core on one side of the negative collector so that the negative collector and the second half case 3 encapsulate the electrical core and insulate and seal the peripheral contact portion between the negative collector and the first half case 2; connecting the positive collector and negative collector to make another side of the positive collector and another side of the negative collector contact each other and form a bipolar plate 4.

Figure 3:
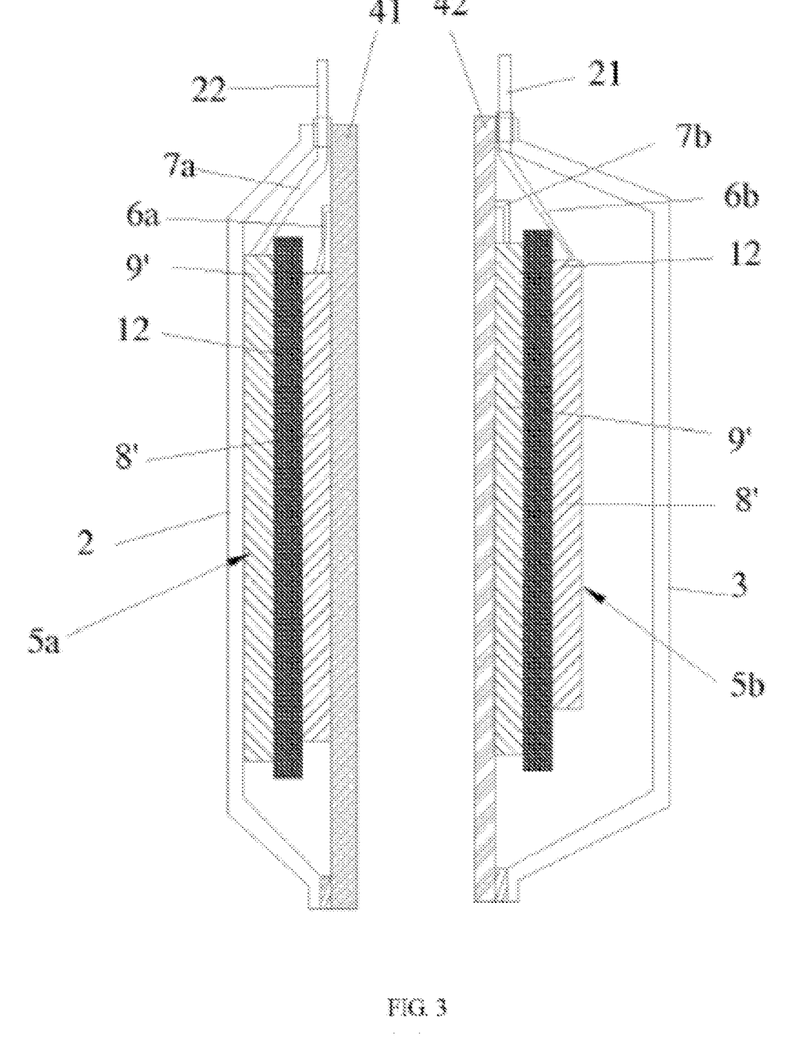
FIG. 3 and FIG. 4 are schematic diagrams of an embodiment of the manufacturing method of the bipolar battery provided by the present invention.

Taking a bipolar plate 4 comprising aluminum foil 41 and copper foil 42 for example, as shown in FIG. 3 and FIG. 4, aluminum foil 41 is used as a positive collector, and copper foil 42 is used as a negative collector.

Specifically, as shown in FIG. 3, firstly, first electrical core 5a is encapsulated between aluminum foil 41 and first half case 2 (first electrical core 5a may be formed by stacking double-sided positive plate 8', diaphragm 12 and double-sided negative plate 9' in the foregoing embodiment), and second electrical core 5b is encapsulated between copper foil 42 and second half case 3 (second electrical core 5b may also be formed by stacking double-sided positive plate 8', diaphragm 12 and double-sided negative plate 9' in the foregoing embodiment). Wherein, negative tab 22 is led out from between aluminum foil 41 and first half case 2. Tab film 13 and first sealant 14 are used to realize insulation and sealing on periphery, among negative tab 22, aluminum foil 41 and first half case 2. Positive tab 21 is led out from between copper foil 42 and second half case 3. Tab film 13 and first sealant 14 are used to realize insulation and sealing on periphery, among positive tab 21, copper foil 42 and second half case 3.

Then, aluminum foil 41 and copper foil 42 are connected, with their sides not coated with active material facing each other. The exposed copper foil 42 and aluminum foil 41 may be bound or form contact by mechanical force so that aluminum foil 41 and copper foil 42 constitute a bipolar plate 4 and finally form a bipolar battery as shown in FIG. 4.

In the foregoing embodiment, the two sides of bipolar plate 4 are coated with a positive electrode active material and a negative electrode active material respectively to form double electrodes. Alternatively, the two sides of bipolar plate 4 may be not coated with an active material and instead are arranged opposite to the positive or negative of the unit cells on the two sides through isolation by diaphragm 12.

Figure 6:
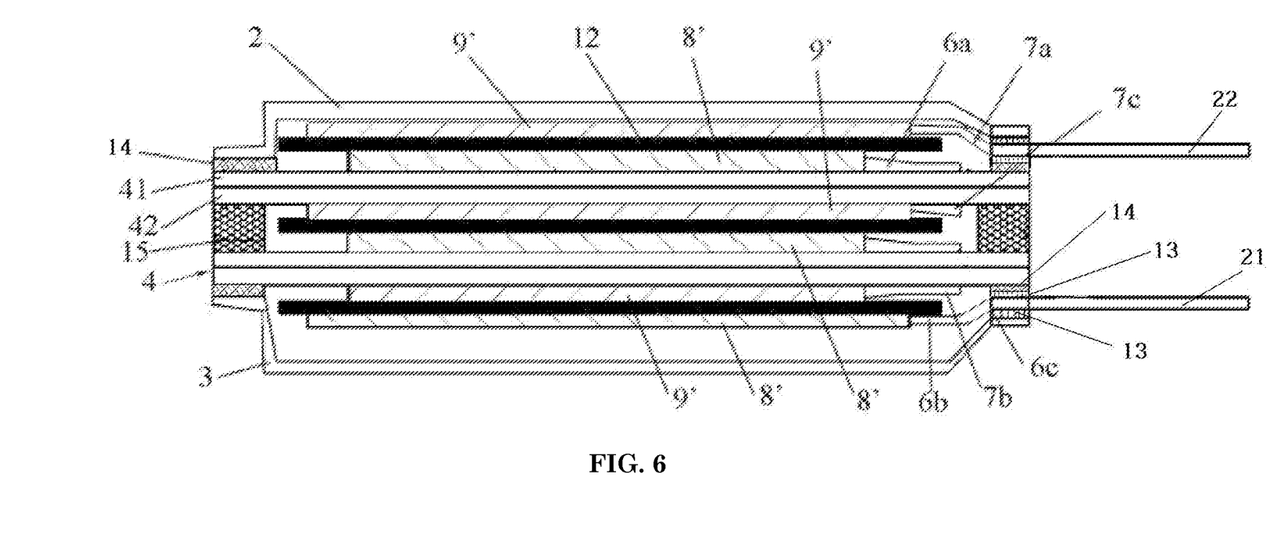
FIG. 6 is a schematic diagram of the internal structure of an embodiment of the bipolar battery provided by the present invention.

FIG. 6 illustrates an embodiment with a combination of a tab film 13, a first sealant 14, and a second sealant 15.

The above description indicates the bipolar battery according to one embodiment of the present invention on the one hand may raise output voltage by installing bipolar plates and on the other hand, a case made of flexible packaging material may be used and encapsulation may be adopted only on the peripheries of the bipolar plate collector and the case to make for assembly and maintenance. Those skilled in the art may understand the present invention is not only applicable to bipolar lithium ion batteries but also applicable to other available electrochemical energy storage elements, such as; lithium battery, Ni-MH-batteries, magnesium batteries, sodium-sulfur batteries, Ni—Cd batteries and lead acid batteries.

Above the preferred embodiments of the present invention are described by referring to the accompanying drawings, but the present invention is not limited to the details of the foregoing embodiments. Within the scope of technical thoughts of the present invention, the technical solutions of the present invention may be subjected to various simple modifications. All these simple modifications belong to the protective scope of the present invention.

Further, it should be noted that the concrete technical features described in the foregoing embodiments may be combined in any appropriate ways under the condition of no conflicts. In order to avoid unnecessary repetition, the present invention will not describe all the possible combinations.

Further, the embodiments of the present invention may be freely combined, too as long as they do not go against the thought of the present invention. Likewise, they shall be deemed as content disclosed by the present invention.

The invention claimed is:

1. A bipolar battery, wherein the bipolar battery comprises:
   a case, having a first half case and a second half case;
   at least one bipolar plate(s), with periphery of said bipolar plate(s) sealed and sandwiched between the first half case and the second half case;
   at least two electrical cores, located at opposite two sides of the bipolar plate(s) respectively, and
   a positive tab and a negative tab, which are arranged among the first half case, bipolar plate(s) and the second half case and extend outside of the case,
   wherein the at least two electrical cores comprise a first electrical core inside a chamber between the first half case and the bipolar plate(s) adjacent to the first half case, and a second electrical core inside a chamber between the second half case and the bipolar plate(s) adjacent to the second half case, wherein the first electrical core comprises a first positive lead and a first negative lead, and the second electrical core comprises a second positive lead and a second negative lead; the first positive lead is electrically connected to a positive of the bipolar plate(s) adjacent to the first half case, and the first negative lead is electrically connected to the negative tab; the second negative lead is electrically connected to a negative of the bipolar plate(s) adjacent to the second half case, and the second positive lead is electrically connected to the positive tab, insulating and sealing pieces are arranged among the bipolar plate(s), the first half case, the second half case, the positive tab and the negative tab at the periphery of the case, at the periphery of the case, tab films are used to realize sealing and insulation between the positive tab and the case and between the negative tab and the case; tab film and first sealant are used to realize sealing and insulation between the positive tab and the bipolar plate(s) and between the negative tab and the bipolar plate(s), wherein the tab film contacts the positive tab and the negative tab, and the first sealant contacts the bipolar plate(s); a first sealant is used to realize sealing and insulation between the bipolar plate(s) and the first half case and between the bipolar plate(s) and the second half case; a second sealant is used to realize sealing and insulation between adjacent bipolar plates; the melting point of the second sealant is lower than that of the first sealant.

2. The bipolar battery according to claim 1, wherein hot melt adhesive is provided on the periphery between the first half case and the bipolar plate(s) and on the periphery between the second half case and the bipolar plate(s), so that hot melt sealing is formed between the first half case and the periphery of the bipolar plate(s) and between the second half case and the periphery of the bipolar plate(s).

3. The bipolar battery according to claim 1, wherein at least the portions where the first half case and the second half case contact the bipolar plate(s) are made of flexible packaging material.

4. The bipolar battery according to claim 1, wherein the at least one bipolar plate(s) divides the interior of the case into a plurality of chambers, each of which comprising one of the electrical cores therein, each electrical core comprises one unit cell or a plurality of unit cells in parallel, and said at least two electrical cores are connected in series through the bipolar plate(s).

5. The bipolar battery according to claim 1, wherein the at least one bipolar plate(s) comprise a plurality of bipolar plate(s), the at least two electrical cores comprise a third electrical core located between two adjacent bipolar plate(s), the third electrical core comprises a third positive lead and a third negative lead, the third positive lead is connected to the positive of one of the two adjacent bipolar plate(s), and the third negative lead is connected to the negative of the other of the two adjacent bipolar plate(s).

6. The bipolar battery according to claim 1, wherein the first positive lead and second negative lead are arranged on one side of the case, and the second positive lead and first negative lead are arranged on another side of the case.

7. A vehicle comprising the bipolar battery described in claim 1, wherein the bipolar battery provides power for the vehicle.

* * * * *

UNITED STATES PATENT AND TRADEMARK OFFICE
CERTIFICATE OF CORRECTION

PATENT NO. : 9,979,045 B2  
APPLICATION NO. : 14/772252  
DATED : May 22, 2018  
INVENTOR(S) : Guangli He et al.

Page 1 of 1

It is certified that error appears in the above-identified patent and that said Letters Patent is hereby corrected as shown below:

On the Title Page

At item (54), correct the spelling in the Title by deleting "BIOPOLAR" and inserting --BIPOLAR-- therefor.

Signed and Sealed this  
Thirtieth Day of October, 2018

Andrei Iancu  
*Director of the United States Patent and Trademark Office*